United States Patent [19]

Ogiro et al.

[11] 4,136,366
[45] Jan. 23, 1979

[54] CASSETTE TAPE RECORDER AND METHOD FOR PRODUCING THE SAME

[75] Inventors: Kenji Ogiro, Yokohama; Shin Hashizume, Kamakura; Seii Miyakawa, Yokohama; Masaya Kishi, Kamakura, all of Japan

[73] Assignee: Hitachi, Ltd., Japan

[21] Appl. No.: 830,561

[22] Filed: Sep. 6, 1977

[30] Foreign Application Priority Data

Sep. 8, 1976 [JP] Japan ............................ 51-106669
Jun. 22, 1977 [JP] Japan ............................ 52-73225

[51] Int. Cl.² .................. G11B 15/28; G11B 15/32
[52] U.S. Cl. .................................. 360/96; 242/199; 29/806
[58] Field of Search ......................... 360/96, 105; 242/197–200, 210, 57; 29/200 A

[56] References Cited

U.S. PATENT DOCUMENTS

| | | | |
|---|---|---|---|
| 3,554,465 | 1/1971 | Marukawa | 242/201 |
| 3,609,844 | 10/1974 | Ichikawa | 360/96 |
| 3,819,128 | 6/1974 | Hori et al. | 360/96 |
| 3,834,651 | 9/1974 | Hashizume et al. | 242/199 |
| 3,987,486 | 10/1976 | Ito et al. | 360/96 |
| 4,014,041 | 3/1977 | Cicatelli | 360/96 |

*Primary Examiner*—Alfred H. Eddleman
*Attorney, Agent, or Firm*—Craig & Antonelli

[57] ABSTRACT

A cassette tape recorder including a fixed base plate formed therein with a capstan inserting hole, a pair of openings for reel spindles to extend therethrough, an opening for a recording and reproducing head and an erasing head to extend therethrough and an opening for a pinch roller to extend therethrough, and formed on its upper surface with cassette position regulating portions so that the upper surface serves as a cassette attaching surface. The fixed base plate has on its underside sliding movement guide portions for guiding sliding parts, fastening portions for parts to be fastened and mounting portions for mounting springs so that the underside of the fixed base plate serves as a working part mounting surface. The working parts of the recorder are mounted only on the underside of the fixed base plate in such a manner that a plurality of working parts are stacked one over another by assembling from one direction while the vertical relative positions of the mounted working parts are regulated and the capstan, reel spindles, etc. extend through the hole and openings in the fixed base plate to appear on the cassette attaching surface. Only the uppermost parts are fastened as by screw to the fastening portions of the fixed base plate.

6 Claims, 7 Drawing Figures

CASSETTE TAPE RECORDER AND METHOD FOR PRODUCING THE SAME

LIST OF PRIOR ART REFERENCES (37 CFR 1.56 (a))

The following references are cited to show the state of the art:

U.S. Pat. No. 3,554,465 Yujiro Marukawa Jan. 12, 1971.

U.S. Pat. No. 3,834,651 Shin Hashizume & et al. Sept. 10, 1974.

This invention relates to the construction of a cassette tape recorder and a method for producing the same.

Generally, a cassette tape recorder has a mechanism such that one hundred and scores of working parts are mounted in a limited space. Since the working parts differ from one another in shape and material and function in such a manner that they are related to one another in a complex fashion, it has hitherto been customary to mount the working parts on the fixed base plate of a recorder at both sides thereof from both directions as disclosed, for example, in U.S. Pats. Nos. 3,554,465 and 3,834,651. This method is convenient from the points of view of the space factor of the fixed base plate and the designing of the mechanisms. However, this method for producing a cassette tape recorder is a troublesome process and has disadvantages in that the production cost is high and a difficulty is encountered in repairing the recorder produced by this method.

SUMMARY OF THE INVENTION

An object of this invention is to provide a cassette tape recorder and a method for producing the same wherein only one side of the fixed base plate is used as a working part mounting surface and working parts are mounted simply from one direction, whereby the productivity of the cassette tape recorder can be improved and the repairability thereof can be increased.

Another object is to provide an inexpensive cassette tape recorder and a method for producing the same wherein the working parts mounted one after another simply from one direction are stacked one over another while the relative vertical positions thereof are regulated, and only the uppermost working parts are fastened to the fixed base plate as by screws, so that fasteners such as screws can be reduced in number and the method steps to be followed and the parts to be used can be reduced in number.

Another object is to provide a cassette tape recorder and a method for producing the same adapted for assembling working parts by means of an automatic assembling machine for the production of the cassette tape recorder.

According to the invention, the aforesaid objects are accomplished by providing means whereby the working parts which perform their functions on the upper surface of the fixed base plate, such as a recording and reproducing head, an erasing head and a pinch roller, are mounted on the underside of the fixed base plate in a manner to extend through openings formed in the fixed base plate to appear on the upper surface thereof and supported on the underside thereof for free movement or sliding movement. Stated differently, no working parts are mounted on the fixed base plate from the direction of the upper surface of the fixed base plate, and all the working parts can be mounted from one direction only.

A pair of reel spindles positioned on the upper surface of the fixed base plate and adapted to engage in a pair of reel openings of a cassette, a plate spring for pressing against the rear portion of the cassette, and an inadvertent erasion preventing rotary arm for detecting the presence or absence of an inadvertent erasion preventing pawl provided to the rear portion of the cassette are also mounted from the direction of the underside of the fixed base plate.

DESCRIPTION OF THE PREFERRED EMBODIMENT

Figure 1:
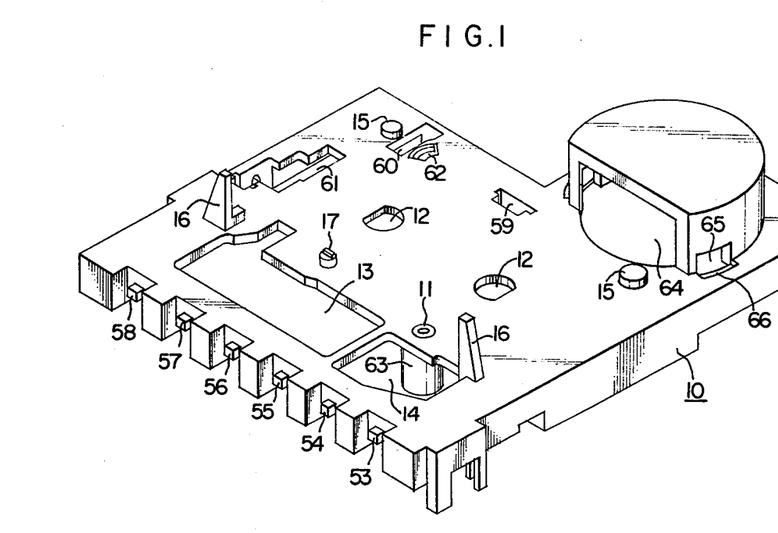
FIG. 1 is a perspective view of the fixed base plate used in this invention, with its upper surface facing upwardly and seen obliquely downwardly from above.

The invention will now be described with reference to a preferred embodiment shown in the accompanying drawings. A fixed base plate 10 will be first described by referring to FIGS. 1 and 2. The base plate 10 is formed as of a synthetic resinous material in a unitary structure and has in its planar surface a hole 11 for inserting a capstan 278 therein, openings 12, 12 for permitting two reel spindles 204 and 205 to extend therethrough respectively, an opening 13 of an area large enough to permit a recording and reproducing head 138, an erasing head 139 and parts supporting these heads to extend therethrough and to enable the heads to move between their inoperative and operative positions, and an opening 14 of an area large enough to permit a pinch roller 142 and a pinch roller arm 140 for supporting the pinch roller 142 to extend therethrough and to enable them to move between an inoperative position and an operative position. The base plate 10 has on its upper surface a plurality of position regulating portions 15, 15, 16, 16 and 17 which are adapted to be positioned against the underside and the front surface of a cassette (not shown) and to be inserted in openings formed in the cassette for effecting regulation of the position of the cassette, with the result that the upper surface of the base plate 10 provides a cassette attaching surface. Also, the base plate 10 has on its underside sliding movement guide portions 18-35 for guiding a plurality of sliding parts, columns and other pivotal portions 36-41 for supporting a plurality of rotating parts, spring mounting portions 42-46 for supporting one end of a plurality of springs, and threadably fastening portions 47-52, so that the underside of the base plate 10 serves as a working part mounting surface. The numerals 53-58 designate spring engaging portions, the numerals 59-62 openings, the numeral 63 a boss for the capstan, and the numeral 54 a motor compartment.

Figure 2:
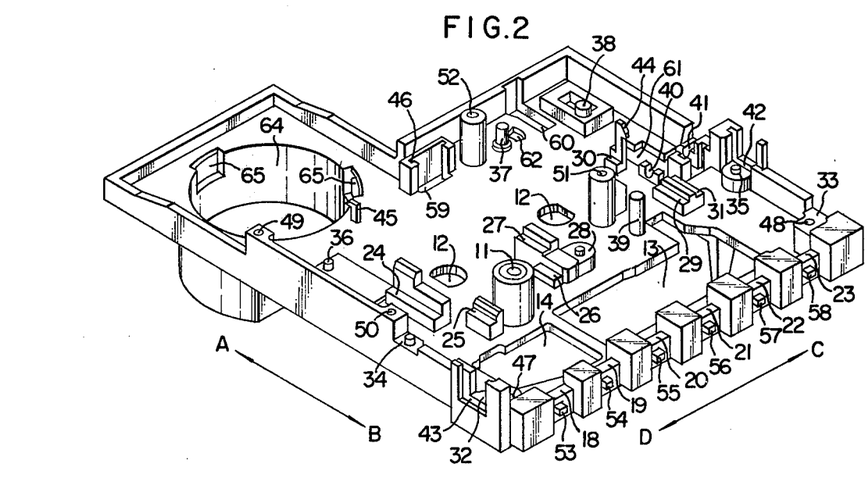
FIG. 2 is a perspective view of the fixed base plate shown in FIG. 1, with its underside facing upwardly and seen obliquely downwardly from above.
Figure 3:
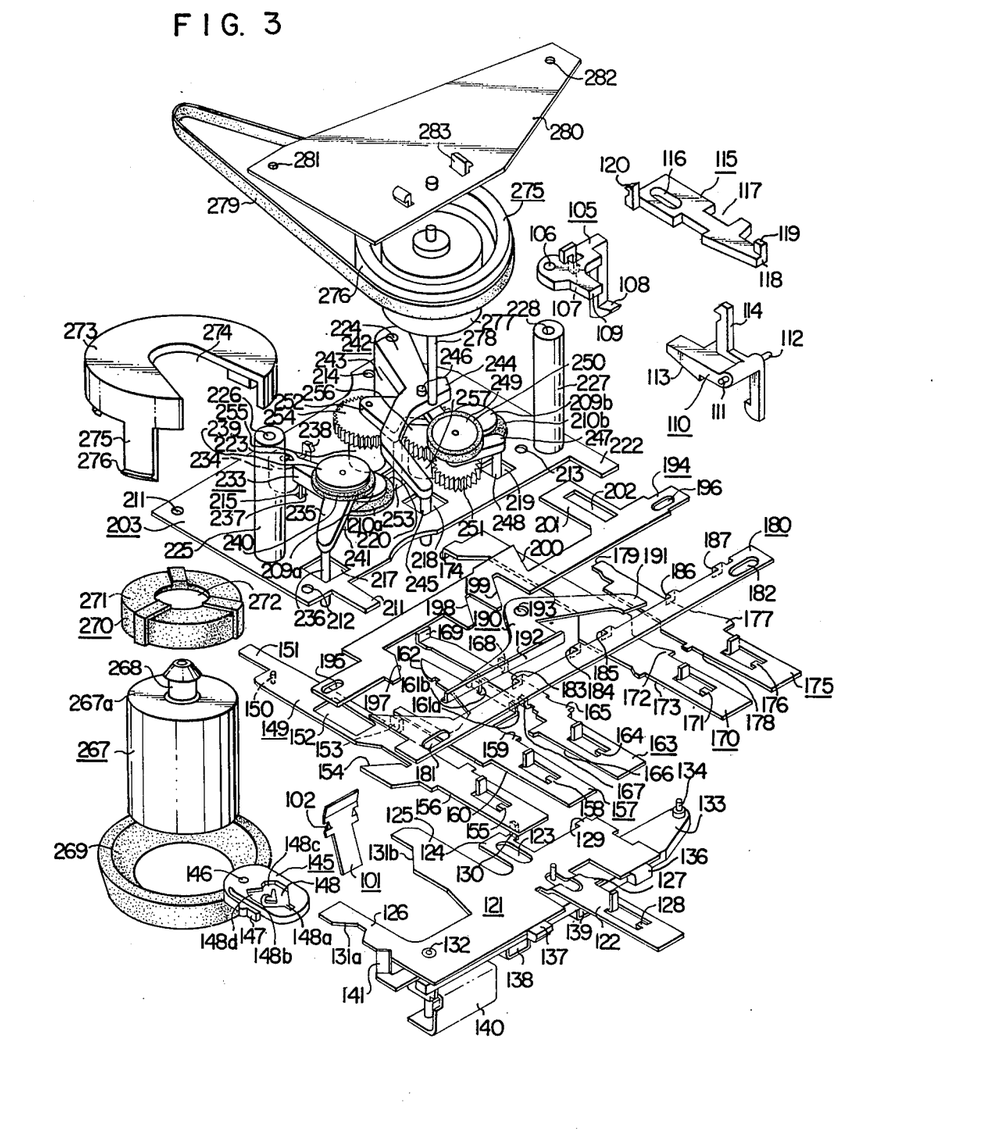
FIG. 3 is an exploded perspective view of the working parts to be mounted on the underside of the fixed base plate shown in FIG. 2.

By referring mainly to FIGS. 2 and 3, one embodiment of the shapes of the working parts and the order in which the working parts are mounted on the base plate 10 will now be described. In mounting the working parts as presently to be described, the base plate 10 is placed upside down as shown in FIG. 2 and the working parts are inserted or stacked one over another from a single direction.

First of all, a cassette pressing plate spring 101 is inserted in the opening 59. The plate spring 101 has an increased width base portion which is formed at both edges thereof with shaved portions 102 of a triangular shape. By force fitting the shaved portions 102 in the groove-shaped spring engaging portions 46, the plate spring 101 is fixed in place in the position shown in FIG. 7. The plate spring 101 has a small width portion which extends above the cassette attaching surface of the base plate 10 to press against the rear end face of the attached cassette, thereby regulating the position of the cassette. Plate springs 103 and 104 (See FIG. 4), which are each formed at its base portion with shaved portions similar to the shaved portions of plate spring 101, are inserted and fixed in place in the spring engaging portions 42 and 43, respectively, provided at both sides of the base plate 10.

The numeral 105 designates an inadvertent erasion preventing rotary arm comprising an opening 106 adapted to receive the columnar boss 37, and a resilient engaging portion 107 adapted to engage in the segmental opening 62. The rotary arm 105 is rotatably supported by the base plate 10 as it is vertically mounted on the working part mounting surface thereof. The rotary arm 105 further comprises a detecting portion 108 extending through the opening 60 in the base plate 10 to appear on the cassette attaching surface for detecting the presence or absence of a pawl mounted at the rear portion of the cassette for preventing inadvertent erasion of the recorded material on the tape. The rotary arm 105 further comprises a checking portion 109 juxtaposed against a tongue 174 of a recording operating member 170 for deciding whether or not the operating member 170 can be pressed. Although the rotary arm 105 is biased clockwise in FIG. 4 as by a resilient member (not shown), a stopper (not shown) is provided to prevent a further clockwise movement of the rotary arm 105 from its position shown in FIG. 4.

The numerals 110 and 115 designate an ejecting member and an ejection aiding member, respectively, adapted to contribute to ejection of the cassette. The ejecting member 110 comprises an ejecting portion 113 supported at its columnar shaft portions 111 and 112 by the U-shaped grooves 40 and 41 respectively of the base plate 10 for rotation relative to the base plate 10 to substantially fill, in a horizontal plane, the opening 61 formed in the cassette attaching surface, and a pressed portion 114 projecting above the working part mounting surface. The ejection aiding member 115 is placed on the ejecting member 110 in such a manner that a slot 116 receives therein the columnar projection 38 of the base plate 10 and the pressed portion 114 of the ejecting member 110 is disposed in a rectangular cut 117 formed in the edge of the member 115. The ejection aiding member 115 further comprises a pressed portion and a projection designated by the numerals 118 and 119 respectively and having functions subsequently to be described, and a spring engaging portion 120 for mounting a spring 258 between it and the spring engaging portion 44 of the base plate 10 so as to bias the ejection aiding member 115 counterclockwise in FIG. 4.

Figure 5:
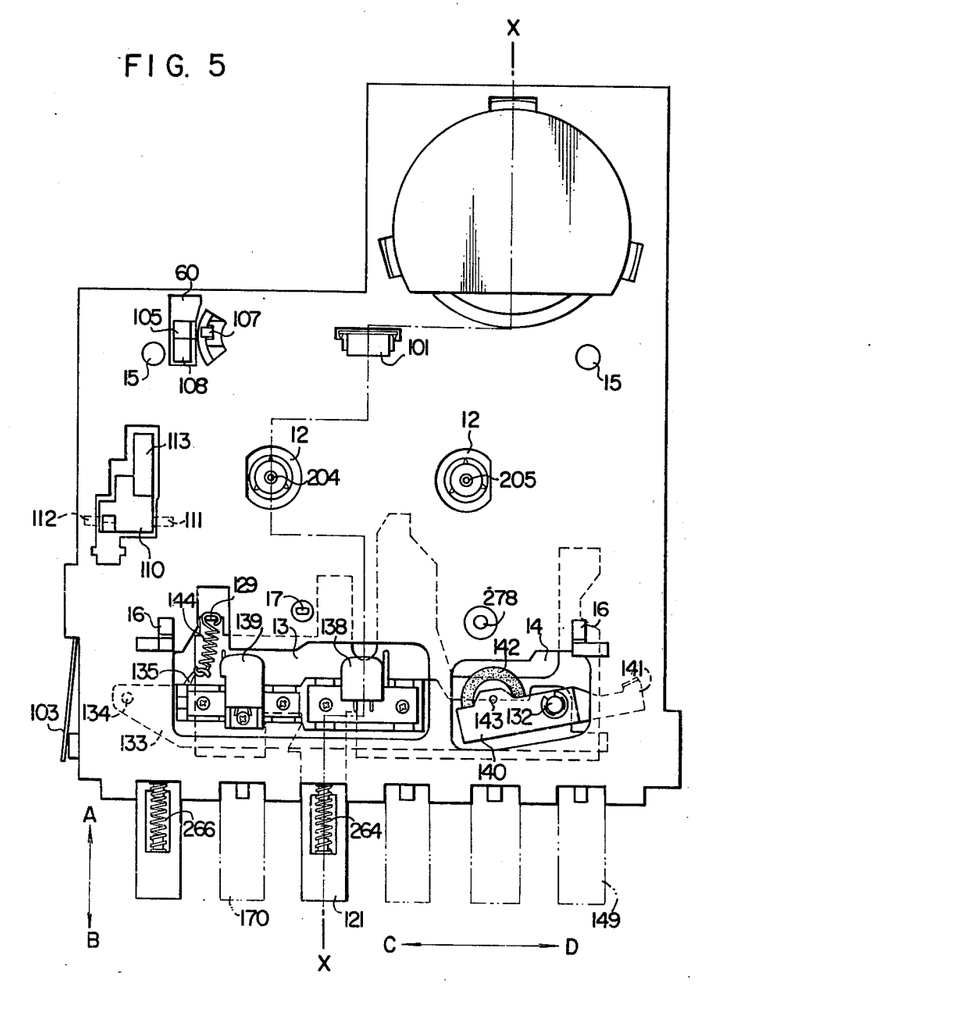
FIG. 5 is a top plan view of the fixed base plate, showing only the working parts concerned in the reproduction and stopping of the tape.

The numeral 121 designates a reproduction operating member comprising a sliding portion 122 of a small width, a sliding portion 124 formed therein with a slot 123, a sliding portion 125 of a large width, and a sliding portion 126 disposed on the left side which are placed on the sliding movement guide portions 21, 28, 26 and 24 of the base plate 10 respectively. The sliding portions 122, 124, 125 and 126 have their positions regulated in such a manner that they are capable of moving in sliding motion in the directions of arrows A and B in FIG. 2. The reproduction operating member 121 is formed with a triangular locking portion 127, spring engaging portions 128, 129, a projection 130, and two oblique sides 131a, 131b, and has a shaft 132 secured thereto. The shaft 132 rotatably supports, as shown in FIG. 5, a head plate 133 mounting the recording and reproducing head 138 and erasing head 139 thereon, and the pinch roller arm 140 rotatably supporting the pinch roller 142 through a shaft 143. A spring 144 is mounted between a spring engaging portion 135 of the head plate 133 and the aforesaid spring engaging portion 129 of the reproduction operating member 121 so as to thereby bias the head plate 133 clockwise in FIG. 5. However, stoppers 136, 137 (See FIG. 3) provided to the head plate 133 are positioned against the edge of the reproduction operating member 121 so as to restrict the clockwise movement of the head plate 133. The pinch roller 140 is also biased clockwise in FIG. 5 by a resilient means (not shown), and its clockwise movement is restricted by a limiting means (not shown). The numerals 134 and 141 designate projections provided to the head plate 133 and pinch roller arm 140 respectively for performing the function of moving the heads 138, 139 and pinch roller 142 away from the cassette. The head plate 133 and pinch roller arm 140 constructed as aforementioned are affixed to the reproduction operating member 121 in a separate processing step. By mounting the reproduction operating member 121 of this construction on the base plate 10, the recording and reproducing head 138 and erasing head 139 extend through the opening 13 and the pinch roller 142 and pinch roller arm 140 extend through the opening 14 to appear on the cassette attaching surface of the base plate 10.

A locking member 145 for a temporary stop operating member 149 is formed with a circular opening 146, a resilient side portion 147 and a heart-shaped cam groove 148, and rotatably supported by the base plate 10 through the columnar projection 36 fitted in the circular opening 146. The temporary stop operating member 149 has a pin 150 affixed to a portion thereof near its forward end and directed downwardly to be received in the cam groove 148 of the locking member 145. The member 149 comprises a forward end portion 151 for keeping the locking member 145 down from above to prevent its dislodging, an opening 152 and a projection 153 and an oblique side 154 in its central portion, and a spring engaging portion 155 and a sliding portion 156 in its rear portion. The temporary stop operating member 149 constructed as aforementioned is located in a manner to straddle the sliding movement guide portion 18 of the base plate 10, the reproduction operating member 121, and the locking member 145. At this time, pin 150 is inserted in the cam groove 148 of the locking member 145, and a projecting portion 141 of the pinch roller arm 140 is positioned against the oblique side 154. The temporary stop operating member 149 is prevented from moving in the directions of arrows C and D in FIG. 2 by the sliding movement guide portions 18, 24 and inner wall surfaces of the base plate 10 and allowed to move in sliding motion in the directions of arrows A and B only.

The numeral 157 designates a fast-forward operating member provided with a spring engaging portion 158, a locking portion 159, a sliding portion 160, two projections 161a, 161b, and a tapering portion 162. The fast-forward operating member 157 is placed on the sliding movement guide portions 19, 25 of the base plate 10 and the reproduction operating member 121 for sliding movement in the directions of the arrows A and B in FIG. 2. The numeral 163 refers to a rewind operating member provided with a spring engaging portion 164, a locking portion 165, a sliding portion 166 and three projections 167, 168 and 169 and placed on the sliding guide portions 20, 27 of the base plate 10 and the reproduction operating member 121 for sliding movement in the directions of the arrows A and B in FIG. 2.

The numeral 170 designates a recording operating member provided with a spring engaging portion 171, a locking portion 172, a sliding portion 173 and a tongue 174 and placed on the sliding movement guide portions 22, 29 of the base plate 10 and the reproduction operating member 121 for sliding movement in the directions of the arrows A and B in FIG. 2.

The numeral 175 designates a stop and ejection operating member provided with a spring engaging portion 176, an unlocking portion 177, a sliding portion 178 and a pressing portion 179 and placed on the sliding movement guide portions 23, 31 of the base plate 10 for sliding movement in the directions of the arrows A and B in FIG. 2.

Figure 4:
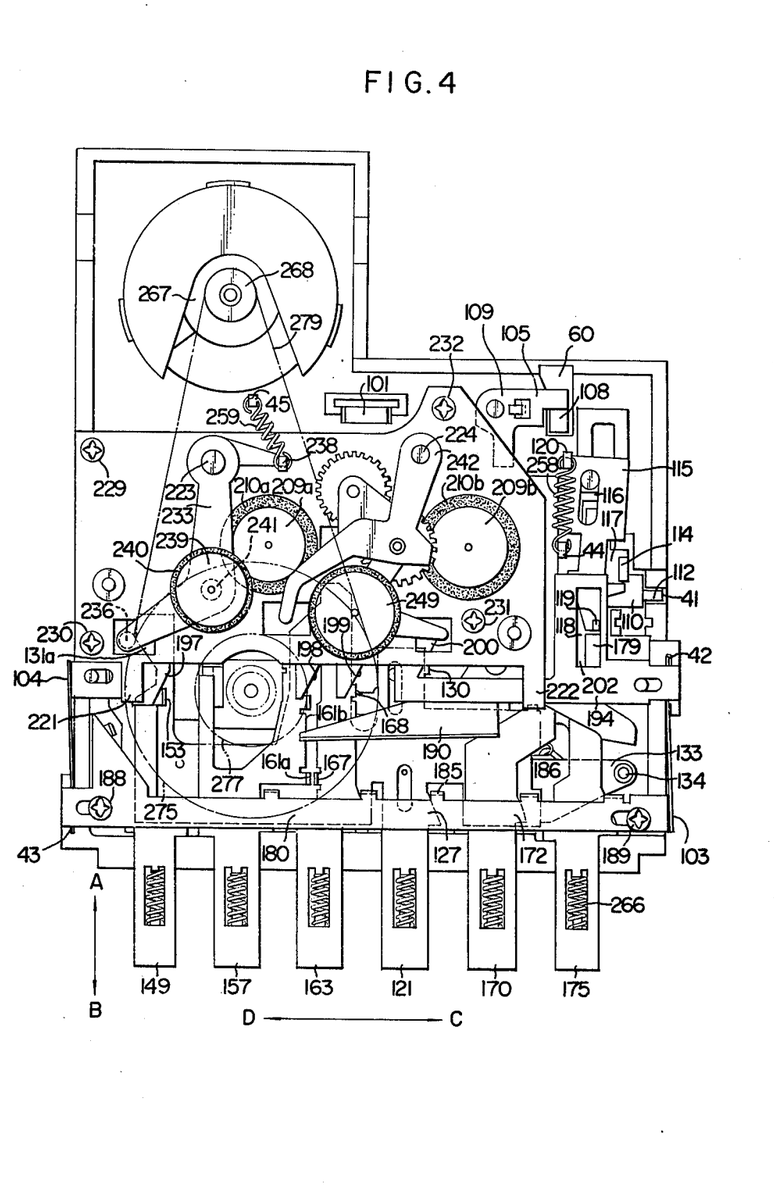
FIG. 4 is a bottom plan view of the fixed base plate on which the working parts have been mounted.

The numeral 180 refers to a locking member formed with two slots 181, 182 and five tongues 183–187 and placed on the sliding movement guide portions 32, 35 of the base plate 10 in a manner to straddle the aforementioned six operating members 149, 157, 163, 121, 170 and 175. After the member 180 is thus located, screws 188 and 189 extend through the slots 181 and 182 respectively and threadably connected to the threaded openings 47 and 48 of the base plate 10, so as to permit the member 180 to move in the directions of the arrows C and D in FIG. 2. As shown in FIG. 4, the locking member 180 is in engagement with the plate spring 103 at its right end, so that the member 180 is biased leftwardly in FIG. 4.

The numeral 190 refers to a rotary member having a pressing portion 191 at one end thereof, a bent pressed portion 192 at the other end thereof and an opening 193 substantially in the center thereof and functioning in review and cue modes. The columnar projection 39 of the base plate 10 is fitted in the opening 193 and serves as a pivot for rotary movement of the member 190. When the member 190 is in this position, one end portion thereof straddles the recording operating member 170 and the stop and ejection operating member 175 in such a manner that the pressing portion 191 thereof is juxtaposed against the projection 134 of the head plate 133, while the other end portion thereof straddles the rewind operating member 163 and the fast-forward operating member 157 in such a manner that the pressed portion 192 thereof is juxtaposed against the projections 167 and 161a of the rewind operating member 163 and the fast-forward operating member 157.

The numeral 194 designates a keep plate formed with two slots 195, 196, four oblique sides 197–200, and a rectangular portion 201 formed therein with a rectangular opening 202. The keep plate 194 is placed on the sliding movement guide portions 34, 35 of the base plate 10 in such a manner that it straddles the rotary member 190, rewind operating member 163, fast-forward operating member 157 and temporary stop operating member 149. By fitting columnar projections on the sliding guide portions 34, 35 of the base plate 10 in the slots 195 and 196 of the keep plate 194, the keep plate 194 can be moved in sliding motion in the directions of the arrows C and D in FIG. 2. The keep plate 194 has a shock absorbing member (not shown) of substantially the same thickness as the rotary member 190 secured to the underside thereof which is positioned against the temporary stop operating member 149, fast-forward operating member 157 and rewind operating member 163, so as to control the upward movement of the aforesaid members. In mounting the keep plate 194 on the base plate 10, the projection 119 of the ejection aiding member 115 is inserted in the rectangular opening 202 of the keep plate 194, and the projections 153, 161b, 168 and 130 of the temporary stop operating member 149, fast-forward operating member 157, rewind operating member 163 and reproduction operating member 121 are positioned against the oblique sides 197, 198, 199 and 200, respectively, of the keep plate 194 as shown in FIG. 4. The keep plate 194 is positioned at its left end against the plate spring 104 as shown in FIG. 4, so that the keep plate 197 is biased rightwardly in FIG. 4.

Figure 7:
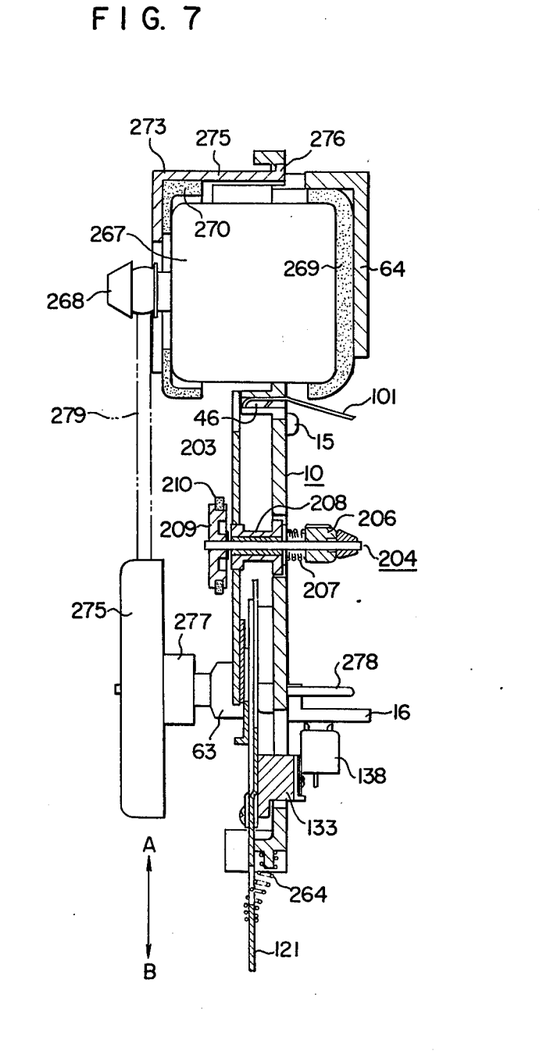
FIG. 7 is a sectional side view taken along the line 7—7 of FIG. 5.

The numeral 203 designates a sub-base plate to which the supply reel spindle 204 and take-up reel spindle 205 (See FIG. 5) are affixed in a separate processing step. As shown in FIG. 7, the two reel spindles 204, 205 are each rotatably supported by a bearing 208 secured to the sub-base plate 203, and urged by the biasing force of a spring 207 to extend above the cassette attaching surface of the base plate 10. A rotary body 206 of the supply reel spindle 204 adapted to come into engagement with a rotating hub of the cassette is exposed, while an idler 209 affixed to the spindle 204 and provided at its outer periphery with a ring-shaped rubber tire 210 is exposed on the working part mounting surface of the base plate 10. Referring to FIG. 3, the sub-base plate 203 comprises four circular openings 211–214 for permitting four screws 229–232 to extend therethrough respectively, two segmental openings 215, 216, four square openings 217–220, two keep portions 221, 222 for keeping down the keep plate 197 at two points, two columns 223, 224, and two bosses 225, 227 formed therein with threaded openings 226, 228 respectively. The sub-base plate 203 of the aforesaid construction is placed on the base plate 10 in such a manner that the circular openings 211–214 of the former are aligned with the threaded openings 49–52 respectively of the latter, and the sub-base plate 203 and the base plate 10 are fastened together by the screws 229–232. By fastening the two plates 203 and 10 together in this way, the keep plate 194 is kept down by the keep portions 221, 222 of the sub-base plate 203. Stated differently, the keep plate 194, rotary member 190, stop and ejection operating member 175, recording operating member 170, rewind operating member 163, fast-forward operating member 157, temporary stop operating member 149, reproduction operating member 121, locking member 145, ejection aiding member 115, and ejecting member 110 that have already been mounted one over another in a stack are prevented from dislodging by moving upwardly, so that the aforesaid working parts are supported either by the sliding movement guide portions of the base plate 10 for sliding motion or by the pivot columns thereof for rotary movement.

The numeral 233 designates a rotary member adapted to be rendered operative when the tape is moved at a predetermined speed, which comprises a pivotal base 234 having a columnar hole for receiving therein the column 223 affixed to the sub-base plate 203, an arm 235 of a substantially crank-shape, and a spring engaging portion 238 which are formed integrally with one another. The arm 235 has a rod 236 extending from its forward end, and a resilient engaging portion 237 attached to its base and having the same shape as the resilient engaging portion 107 of the rotary arm 105. The arm 235 supports at its intermediate portion an idler 239 having a rubber tire 240 secured to its outer periphery, and a rotary shaft 241 coaxial with the idler 239, so that the idler 239 and shaft 241 rotate as a unit. By inserting the column 223 of the sub-base plate 203 in the columnar hole of the pivotal base 234 and inserting the resilient engaging portion 237 and the rod 236 in the openings 215 and 217 respectively of the sub-base plate 203, a pawl at the forward end of the resilient engaging portion 237 is brought into engagement with the underside of the sub-base plate 203, with the result that the rotary member 233 is supported for rotation relative to the sub-base plate 203. When the rotary member 233 is supported in this manner, the rotary shaft 241 is positioned against the rubber tire 210a of the idler 209a for the take-up reel and the rod 236 is positioned against the oblique side 131a of the reproduction operating member 121.

The numeral 242 designates a rotary member adapted to be rendered operative when the tape is moved at high speed as in the fast-forward and rewind modes, which comprises a pivotal base 243 having a columnar hole for receiving therein the column 224 affixed to the sub-base plate 203, a bent arm 244, and a spring engaging portion (not shown) which are formed integrally with one another. The arm 244 has a rod 245 extending from its forward end, and a resilient engaging portion (not shown) attached to its base and having the same shape as the resilient engaging portion 237 of the rotary member 233. The arm 244 has affixed to its intermediate portion a shaft 246 which supports two arms 247, 252 and a rotary body consisting of a gear 256 and a cylinder 257 formed as a unit for rotation independently of each other. The arm 247 has a rod 248 extending from its forward end, and an idler 249 having a rubber tire 250 secured to its outer periphery and a gear 251 adapted to mesh with gear 256 are supported at the intermediate portion of the arm 247 in such a manner that they hold the arm 247 therebetween and rotate as a unit. Thus the arm 247 moves in planetary movement with respect to gear 256. The other arm 252 also has a rod 253 affixed thereto, and supports a gear 254 which has a cylinder 255 attached to its underside to act as a unit with the gear 254. Thus the arm 252 also moves in planetary movement with respect to gear 256.

By inserting the column 224 of the sub-base plate 203 in the columnar hole of the pivotal base 243 and inserting the resilient engaging portion and the three rods 245, 248 and 253 in the openings 216, 218, 219 and 220 respectively of the sub-base plate 203, a pawl at the forward end of the resilient engaging portion (not shown) is brought into engagement with the underside of the sub-base plate 203, with the result that the rotary member 242 is supported for rotation relative to the sub-base plate 203. When the rotary member 242 is supported in this manner, the outer peripheray of the cylinder 257 and the outer periphery of the cylinder 255 are juxtaposed against the rubber tire 210b of the idler 209b for the supply reel and the rubber tire 210a of the idler 209a for the take-up reel respectively for movement toward and away from each other, rod 245 is positioned against the oblique side 131b of the reproduction operating member 121 and the tapering portion 162 of the fast-forward operating member 157, rod 253 is positioned against the projection 169 of the rewind operating member 163, and rod 248 is positioned against one inner side of the opening 219 to restrict the range of movement of the arm 247.

Referring to FIG. 4, the ejection aiding member 115, rotary member 233 and rotary member 242 have tension springs 258, 259 and 260 connected thereto respectively (only springs 258 and 259 are shown), so that the members are biased counterclockwise in FIG. 4. Compression springs 261–266 (only springs 264 and 266 are shown in FIG. 5) are mounted between the spring engaging portions of the six operating members 149, 157, 163, 121, 170 and 175 and the spring engaging portions 53–58 of the base plate 10 respectively, so that all the operating members are biased downwardly in FIG. 4.

A motor 267 having a motor pulley 268 attached thereto is mounted in the motor compartment 64 of the base plate 10 as presently to be described. First, a tray-shaped shock absorbing holder 269 formed as of rubber is inserted in the motor compartment 64, and the motor 267 is placed on the shock absorbing holder 269. A shock absorber 270 formed with an opening 272 in a bottom 271 is applied to a shoulder 267a of the motor 267, and a cap 273 formed in its upper portion with a segmental cutout 274 is applied to the shock absorber 270. The cap 273 includes three tongues 275 formed integrally therewith and extending downwardly, with each of the tongues 275 having an engaging pawl 276 attached to the forward end thereof. On the other hand, the motor compartment 64 is formed at its side wall with three recesses 65 (See FIG. 2) in positions corresponding to the positions of the tongues 275, and stepped portions 66 (See FIG. 1) each communicating with one of the recesses 65 are formed on the upper surface of the base plate 10. Accordingly, by applying the cap 273 to the shock absorber 270, the engaging pawls 276 of the tongues 275 are brought into engagement with the stepped portions 66 of the base plate 10, so that the motor 267 is fixed in place with the motor pulley 268 being exposed through the opening 274 of the cap 273.

The numeral 275 designates a flywheel including a belt training portion 276 and a rotation transmitting portion 277 and having a capstan 278 secured to the center thereof. The capstan 278 is inserted in the columnar hole 11 formed in the boss 63 provided to the base plate 10. Then a belt 279 is trained over the motor pulley 268 and the belt training portion 276 of the flywheel 275, and a fixing plate 280 having a bearing plate 283 and formed with two threaded openings 281, 282 is applied to the flywheel 275. Thereafter, screws (not shown) are threadably inserted in the threaded openings 226, 228 of the bosses 225, 227 on the sub-base plate 203, whereby the flywheel 275 can be rotatably supported by the base plate 10. At this time, the rotation transmitting portion 277 of the flywheel 275 is positioned against the rubber tire 240 of idler 239 and the rubber tire 250 of idler 249.

The working parts of the tape recorder are mounted on the base plate 10 in the aforementioned manner. FIG. 4 shows the working part mounting surface of the base plate 10 after completion of mounting of the working parts.

The operation of the cassette tape recorder constructed as aforementioned will be briefly described hereinafter.

Figure 6:
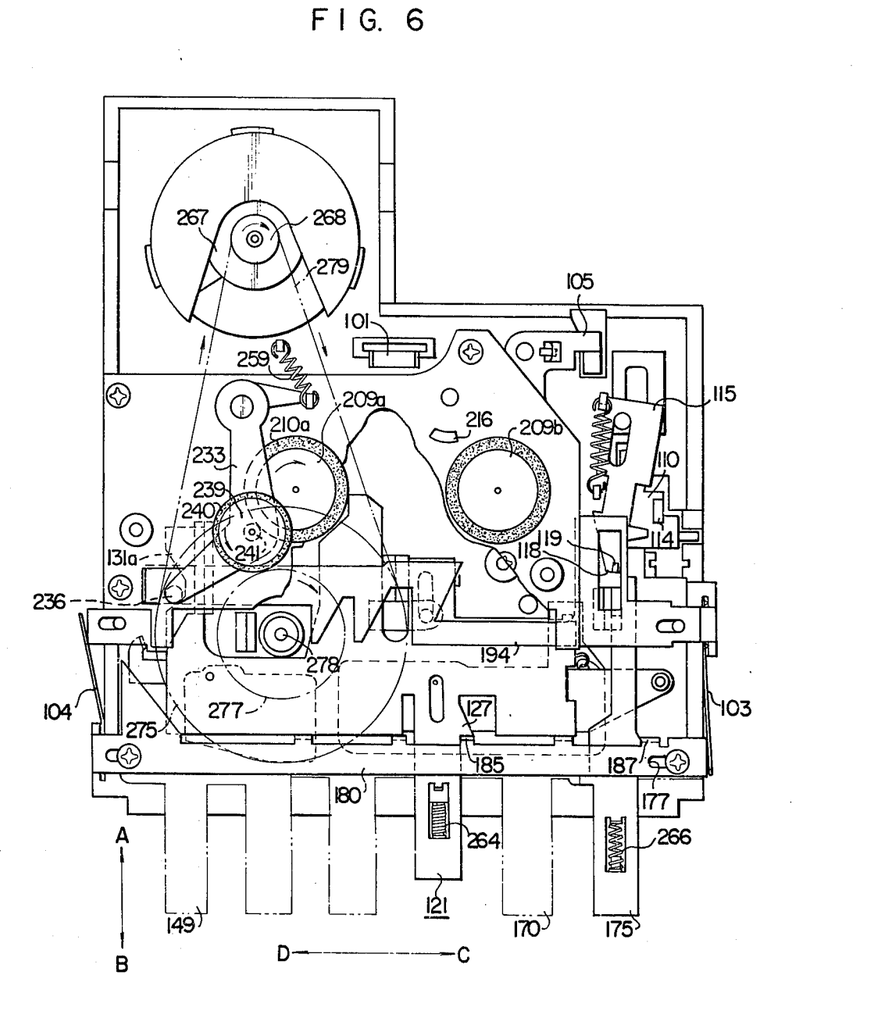
FIG. 6 is a bottom plan view of the fixed base plate, showing only the working parts concerned in the reproduction and stopping of the tape.

The tape recorder can be brought to a reproducing mode by pressing the reproduction operating member 121 in the direction of the arrow A after a cassette has been attached to the cassette attaching surface of the base plate 10. If the reproduction operating member 121 is pressed when the recorder is in an inoperative position shown in FIG. 4, then a reproducing switch (not shown), is turned on so as to set the electric circuit system at a reproducing mode. At the same time, the locking portion 127 of the reproduction operating member 121 is brought into engagement with the tongue 185 of the locking member as shown in FIG. 6. By virtue of this engagement, the recording and reproducing head 138 and erasing head 139 are brought into contact with the tape in the cassette which is held between the pinch roller 142 and the capstan 278 on the upper surface of the base plate 10. On the underside of the base plate 10, the rod 236 of the rotary member 233, which has hitherto been positioned against the vicinity of the forward end of the left-hand oblique side 131a of the member 121 as shown in FIG. 4 to prevent clockwise movement of the rotary member 233, is made to slide inwardly along the oblique side 131a by the biasing force of spring 259 as shown in FIG. 6. As a result, the rubber tire 240 of the idler 239 of the rotary member 233 is brought into contact with the rotation transmitting portion 277 of the flywheel 275 and the rotary shaft 241 is brought into contact with the rubber tire 210a of the take-up idler 209a. Accordingly, rotation of motor 267 is transmitted through the motor pulley 268, belt 279 and flywheel 275 to the capstan 278 to drive the same. At the same time, rotation of motor 267 is transmitted through the rotation transmitting portion 277, idler 239 and rotary shaft 241 to the take-up idler 209a to thereby drive the take-up reel spindle 205. Thus the tape in the cassette is moved at a predetermined speed.

The tape recorder can be brought to a recording mode by pressing the recording operating member 170 in the direction of the arrow A simultaneously as the reproduction operating member 121 is pressed. A tape cassette on which recording can be performed has attached to its rear portion a pawl for preventing inadvertent erasion of the recorded material. Thus the inadvertent erasion preventing arm 105 is moved clockwise in FIG. 5 (counterclockwise in FIG. 4) as the detecting portion 108 thereof is pressed by the pawl. As a result, the checking portion 109 of the arm 105 is moved from the position in which it is positioned against the tongue 174 at the forward end of the recording operating member 170, thereby permitting the recording operating member 170 to be pressed in the direction of the arrow A in the figure. A tape cassette on which some material has inerasably been recorded has no pawl of the aforementioned type. Therefore, when such cassette is attached, the arm 105 is not pressed by the pawl and remains in the position shown in FIG. 4 in which the checking portion 109 is positioned against the tongue 174, thereby making it impossible to press the recording operating member 170. If the recording operating member 170 is pressed together with the reproduction operating member 121 when the member 170 is in a position in which it can be pressed, a recording switch and a reproducing switch (not shown), are turned on and the electric circuit system is set at a recording mode. The two members 170 and 121 are maintained in the pressed positions by the engagement of the locking portions 172 and 127 of the two members 170 and 121 with the tongues 186 and 185 respectively of the locking member 180.

The recorder can be brought to a temporary stop mode by pressing the temporary stop operating member 149 in the direction of the arrow A to equivalently restore the reproducing switch and the recording switch to the stop positions. The maintenance of the recorder in the temporary stop mode and the release of the recorder from that mode will be described by referring to FIG. 3. As aforesaid, the pin 150 of the temporary stop operating member 149 is located in the heart-shaped cam groove 148 of the locking member 145. When the member 149 is inoperative, the pin 150 is positioned in a recessed portion 148a at the lower end of the cam groove 148 by the biasing force of the spring 261 (not shown). Pressing of the operating member 149 brings the pin 150 into engagement with a right inclined surface of a heart-shaped projection 148b located in the cam groove 148, thereby rotating the locking member 145 clockwise. Finally the pin 150 reaches a first crest 148c so that further pressing of the operating member 149 is made impossible. If the operating member 149 is released when it is in this position, the temporary stop operating member 149 tends to return to its original position by virtue of the biasing force of the spring 261. However, the locking member 145 is rotated counterclockwise by the counterclockwise rotating force stored in the resilient side portion 147 by its contact with the inner wall of the base plate 10 when the locking member 145 rotated previously. Thus the heart-shaped projection 148b stands in the path of return movement of the pin 150, so that the pin 150 is received in a depressed portion of the projection 148b, thereby holding the operating member 149 in such position. If the member 149 is held in such position, the oblique side 154 of the member 149 permits the projection 141 of the pinch roller arm 140 to move therealong, so that the pinch roller arm 140 is rotated clockwise in FIG. 3 (counterclockwise in FIG. 5). Accordingly, the pinch roller 142 is moved away from the capstan 278, thereby bringing about a temporary stop of the tape movement.

To release the recorder from the temporary stop mode, the operating member 149 is pressed again. This results in the pin 150 reaching a second crest 148d while causing the locking member 145 to rotate counterclockwise. When the pin 160 reaches the second crest 148d, it is impossible to press and move the operating member 149 any further. If the hand is removed from the operating member 149 at this time, the pin 150 wll be moved by the biasing force of the spring 261 along the left curved surface of the cam groove 148 to return to its original position in the recessed portion 148a. Thus the tape recorder is released from the temporary stop mode.

To convert the recorder from the reproducing or recording mode to a stop mode, one has only to press the stop and ejection operating member 175 in the direction of the arrow A. As shown in FIG. 3, the unlocking portion 177 of the stop and ejection operating member 175 is of a triangular shape like the locking portions 127 and 172 of the playback operating member 121 and the recording operating member 170 respectively, but the portion 177 is slightly larger in size than the portions 127 and 172. Therefore, if, for example, the stop and ejection operating member 175 is pressed in the direction of the arrow A in FIG. 6, the unlocking portion 177 will abut against the tongue 187 of the locking member 180 and cause the locking member 180 to move in sliding motion in the direction of the arrow C against the biasing force of the plate spring 103. This releases the locking portions 127 and 172 from engagement with the tongues 185 and 186 respectively, thereby restoring the reproduction operating member 121 and the recording operating member 170 to their inoperative positions.

A cassette ejecting operation will now be described. If the stop and ejection operating member 175 is pressed when the recorder is in its inoperative position as shown in FIG. 4, the pressing portion 179 at its forward end will be brought into abutting engagement with the pressed portion 119 of the ejection aiding member 115, thereby causing the member 115 to move in sliding movement in the direction of the arrow A against the biasing force of the spring 258. Since the pressed portion 114 of the ejecting member 110 is located in the rectangular cut 117 formed in the edge of the ejection aiding member 115, the sliding movement of the ejection aiding member 115 causes the ejecting member 110 to rotate about the columnar shaft portions 111, 112. Thus the ejecting portion 113 of the ejecting member 110 kicks upwardly the underside of the cassette to thereby eject the latter.

As aforesaid, stop and ejection operations are performed by pressing the stop and ejection operating member 175. It is to be noted that the keep plate 194 has the following function in order to prevent the cassette from being inadvertently ejected when the tape is moving as in the reproducing or recording mode. That is, the keep plate 194 is formed with the four oblique sides 197-200 which are each positioned against one of the projections 153, 161a, 168 and 130 of the temporary stop operating member 149, fast-forward operating member 157, rewind operating member 163 and reproduction operating member 121 respectively. If any one of these operating members is operated, the keep plate 194 will move in sliding motion in the direction of the arrow D against the biasing force of the plate spring 104. Also, since the projection 119 of the ejection aiding member 115 is received in the rectangular opening 202 of the keep plate 194, the sliding movement of the keep plate 194 causes the ejection aiding member 115 to rotate clockwise from its position shown in FIG. 4 to its position shown in FIG. 6. Thus the pressing portion 119 of the stop and ejection operating member 175 and the pressed member 118 of the ejection aiding member 115 are disposed in staggered relationship. Even if the operating member 175 is pressed at this time, the recorder is only brought to a position in which tape movement is stopped as aforesaid. It is after the operating member 175 is pressed again that the ejection aiding member 115 moves in sliding motion, thereby enabling ejection of the cassette to be effected as aforesaid.

The recorder can be brought to a fast-forward mode, a rewind mode, a review mode and a cue mode by operating the fast-forward operating member 157 and rewind operating member 163, by rotating the rotary member 242, by bringing the idler 249 and cylindrical portions 255, 257 into and out of contact with rotation transmitting portion 277 of the flywheel 275, the take-up idler 209a and the supply idler 209b, and by moving the head plate 134 rearwardly through the rotary member 190 which is caused to rotate by the projections 161a and 167. However, since these operations do not form a part of the invention, detailed description thereof will be omitted.

From the foregoing description, it will be appreciated that according to the present invention, the fixed base plate is formed at its underside with sliding movement guide portions, rotary shaft portions, fastening portions, etc. to provide a working part mounting surface, and is formed in its plane with a plurality of openings so as to make possible to mount from the direction of the working part mounting surface those parts which should extend through the openings to appear on the cassette attaching surface of the base plate. Those working parts which have only to have latitude in moving in sliding directions, such as sliding parts, are stacked one over another from one direction while their vertical relative positions are controlled, and only the uppermost parts are fastened as by screws to the fixed base plate. By this arrangement, dislodging of all the parts stacked one over another can be prevented. The rotating parts, such as the inadvertent erasion preventing rotary arm 105, rotary members 233 and 242 and the cap 273 of the motor, are mounted on the fixed base plate from one direction and their dislodging is prevented by means of the resilient engaging portions provided to these rotating parts. The plate springs 101, 103 and 104 are mounted on the fixed base plate from one direction and prevented from dislodging by the shaved portions provided to these plate springs.

As aforesaid, according to the invention, a cassette tape recorder is fabricated by mounting all the working parts vertically from one direction on the working part mounting surface of the fixed base plate. Thus the invention enables automatic assembling of the working parts to be effected, thereby increasing the productivity of tape recorders and permitting assembling of the parts to be performed economically. Moreover, since any part can be removed in one direction as desired, repair and maintenance of the tape recorder can be facilitated. The working parts mounted on the fixed base plate are placed on or fitted in the sliding movement guide portions and pivots for rotating parts and can move either in sliding movement or rotary movement while their movements are positively regulated in planes parallel to the base plate. Also, since the parts are stacked one over another, the relative positions of the working parts can be positively regulated in a vertical direction. These features enable the sliding guide parts and fastening parts to be markedly reduced in number, so that the invention has a high industrial value.

As a method for quantitatively assessing the difficulty of the operation of assembling the working parts of a cassette tape recorder, I have developed the following method. The method is based on a point system in which the number of movements required for mounting each working part (vertical downward movement, horizontal movment, rotary movement, etc.) and the difficulty of each movement are analyzed and the highest point or 100 points is given to a working part which can be assembled by the most simple movement, such as a vertical downward movement. The number of points is reduced by taking various coefficients into consideration according to the number of movements required for mounting a working part and the difficulty of such movements, and the mean number of points is calculated for all the working parts. The results of assessment carried out by the aforesaid method show that, whereas the numbers of points given to cassette tape recorders of the prior art are in the range between 63 and 70 points, the number of points given to the cassette tape recorder according to this invention is 81 points. Also, by using a similar method, it has been ascertained that the assembling cost can be reduced by about 30% by the method of production according to the invention as compared with the assembling costs of recorders assembled by prior art methods.

In the embodiment shown and described hereinabove, the fixed base plate has been described as being formed of a synthetic resinous material in a manner to have various working part supporting portions formed integrally with the planar plate portion. However, it is to be understood that the fixed base plate according to the invention may consist of a metallic plate on which various working part supporting portions are formed of a synthetic resinous material. Also, in the embodiment shown and described hereinabove, a single operating member has been described as being used commonly for performing stop and cassette ejecting operations. However, if separate operations members are used for performing these two operations, the keep plate can be eliminated, so that the upper ends of a plurality of operating members can be kept down by the underside of the sub-base plate. Also, if the sub-base plate 203 is extended to cover the locking member 180, screws 188 and 189 can be done without. What is essential is that the working parts are stacked one over another while the upper and lower parts can be permitted to move relative to one another and can have their positions regulated, with only the uppermost parts being fastened by screws. While the form of recorder herein described constitutes a preferred embodiment of the invention, it is to be understood that the invention is not limited to the specific shapes, combination and arrangements of its working parts, and that changes may be made therein without departing from the scope of the invention which is defined in the appended claims.

We claim:

1. A cassette tape recorder comprising:
   a. a fixed base plate formed on its upper surface with a plurality of position regulating members adapted to be juxtaposed against a plurality of portions of a tape cassette for regulating the attached position of the cassette, and formed therein with openings of an area large enough to permit a magnetic head and a pinch roller respectively to be inserted vertically from below the underside of the fixed base plate to extend through said openings for movement between positions in which the magnetic head and the pinch roller are inoperative and positions in which they are operative to perform recording and reproduction;
   b. a head plate for vertically supporting said magnetic head assembled by being moved in a vertical direction toward the underside of the fixed base plate and mounted on the underside in such a manner that the head plate is capable of moving in sliding motion parallel to the underside and said magnetic head extend through said opening in the fixed plate to appear on its upper surface;
   c. a pinch roller arm for supporting said pinch roller assembled by being moved in a vertical direction towards the underside of the fixed base plate and mounted at its base on the underside in such a manner that said pinch roller can move parallel to the base plate, said pinch roller extending through said opening in the fixed base plate to appear on its upper surface; and
   d. an operating member assembled by being moved in a vertical direction towards the underside of the fixed base plate and mounted on the underside for moving said magnetic head and said pinch roller between their inoperative positions and operative positions, said operating member being connected to said head plate and said pinch roller arm and operative to move the head plate and the pinch roller arm on the underside of the fixed base plate when the recorder is rendered operative, so that the magnetic head and the pinch roller can move on and parallel to the upper surface of the base plate from their inoperative positions to their operative positions in which they are in contact with a tape in the tape cassette attached to the upper surface of the base plate.

2. A cassette tape recorder comprising:
   a fixed base plate according to claim 1 further formed therein with openings for receiving a pair of reel spindles inserted therein in a vertical direction by being moved towards the underside of the base plate in such a manner that the reel spindles appear on the upper surface thereof, and formed on the underside thereof with a plurality of sliding movement guide portions for guiding the sliding movement of sliding parts including the operating member according to claim 1 and a plurality of fastening portions having threaded openings;
   a plurality of operating members for performing recording, fast-forward, rewind, etc. placed in a vertical direction on said sliding movement guide portions on the underside of the fixed base plate and adapted to move in sliding motion parallel to the direction of sliding movement of the operating member according to claim 1;
   a sub-base plate supporting said pair of reel spindles for rotation and formed therein with a plurality of threaded openings corresponding to said fastening portions of the fixed base plate, said sub-base plate being adapted to be positioned at its underside against upper surfaces of said plurality of operating members as the sub-base plate is assembled in a vertical direction by being moved towards the underside of the fixed base plate and placed on said fastening portions on the underside of the base plate; and
   a plurality of screws for fastening said sub-base plate to the underside of said fixed base plate to prevent dislodging of said plurality of operating members from the underside of said sub-base plate.

3. A cassette tape recorder comprising:
   a keep plate interposed between the sub-base plate and the plurality of operating members according to claim 2 and located in such a manner that its underside straddles the plurality of operating members to prevent dislodging of the operating members, said keep plate being operative to move in sliding motion in a direction normal to the direction of sliding movement of any of said operating members as said operating member is actuated;
   a cassette ejecting member supported for rotation by pivot means provided on the underside of the fixed base plate and including a planar cassette push-up portion adapted to fill an opening formed near said pivot means in the base plate, and a pressed portion extending substantially vertically below the underside of the fixed base plate, said cassette push-up portion being operative to push upwardly a tape cassette attached to the upper surface of the base plate as the member rotates about said pivot means;

a stop operating member mounted near said cassette ejecting member and adapted to move in sliding motion parallel to said operating members; and a cassette ejection aiding member resting on said cassette ejecting member in a manner to be interposed between the cassette ejecting member and the keep plate and supported for sliding movement and rotary movement by pivot means on the underside of the fixed base plate, said cassette ejection aiding member including a pressing portion in the form of a rectangular cut in the edge for surrounding the pressed portion of the cassette ejecting member on three sides, an engaging portion adapted to engage said keep plate in a manner to rotate as said keep plate moves, and a pressed portion positioned against the forward end of the stopping operating member, said cassette ejection aiding member normally held by the biasing force of a spring in a position in which said pressed portion is positioned against the forward end of the stop operating member;

said pressed portion of said cassette ejection aiding member being moved through said keep plate from the position in which it is positioned against the forward end of the stop operating member when at least one of said plurality of operating members is disposed in an operative position, and said pressed portion of the cassette ejection aiding member being positioned against the forward end of the stop operating member and the pressing member of the cassette ejecting member being surrounded by the pressing portion in the form of the rectangular, cut when no operating member is in the operative position, the pressing force of the stop operating member being transmitted through the cassette ejection aiding member to the cassette ejecting member only when no operating member is in the operative position, whereby the cassette push-up portion of the cassette ejecting member can be rotated to eject the cassette.

4. A method for producing a cassette tape recorder comprising the steps of:

a. holding a fixed base plate horizontally with its underside facing upwardly, said fixed base plate being formed on its upper surface with at least position regulating portions for regulating the position of a tape cassette and on its underside with at least guide portions for guiding sliding members, pivots for supporting rotating and pivotal members, fastening portions for fastening members together and engaging portions for springs, said fixed base plate further being formed, to extend from its underside to its upper surface, with a capstan inserting hole, openings permitting a pair of reel spindles to extend therethrough, an opening of an area large enough to permit a head to extend therethrough, and an opening of an area large enough to permit a pinch roller and a pinch roller supporting pinch roller arm to extend therethrough;

b. moving a head plate vertically supporting said head and larger in size than said head extending opening in such a manner that the head plate is moved downwardly from above the base plate with the head facing downwardly from the head plate, so that the head projects through the opening to appear above the upper surface of the base plate and the head plate is slidably supported by the sliding member guide portions on the underside thereof;

c. mounting a pivot member at the end of the pinch roller arm opposite the end at which said pinch roller is supported and moving the pinch roller arm downwardly from above the base plate through said pinch roller arm extending opening in such a manner that the pinch roller and the pinch roller arm project through the opening to appear above the upper surface of the base plate and said pivot member is fastened to the fastening member of the base plate to enable the arm to move in pivotal motion;

d. moving downwardly from above the base plate a sub-base plate rotatably supporting said pair of reel spindles and members for rotating the same in such a manner that the reel spindles project through said reel spindle openings and appear above the upper surface of the base plate, with the sub-base plate being fastened to the underside thereof; and e. mounting a flywheel at one end of said capstan and inserting the capstan in the capstan inserting hole in a vertical direction from above the underside of the base plate in such a manner that the flywheel is located on the underside of the base plate and the capstan extends through the hole at its free end to appear above the upper surface threof, the method being characterized in that all the members that should appear above the upper surface of the base plate are assembled vertially from the direction of the underside of the base plate.

5. A method as set forth in claim 4, further comprising the steps of slidably mounting at least a first sliding member of said plurality of sliding members on the sliding member guide portions of the base plate, placing a second sliding member on said first sliding member to prevent dislodging of the latter, and placing a locking member on the second sliding member and fastening the same to the fastening portions.

6. A method as set forth in claim 4, further comprising the steps of moving a plurality of springs downwardly onto the underside of the base plate and mounting the same between the spring engaging portions of the base plate and engaging portions of the members.

* * * * *